Oct. 17, 1967     L. L. KEPKAY ETAL     3,347,244
ROTARY BEATER FOR COMBINE HARVESTERS
Filed Feb. 26, 1965     4 Sheets-Sheet 1
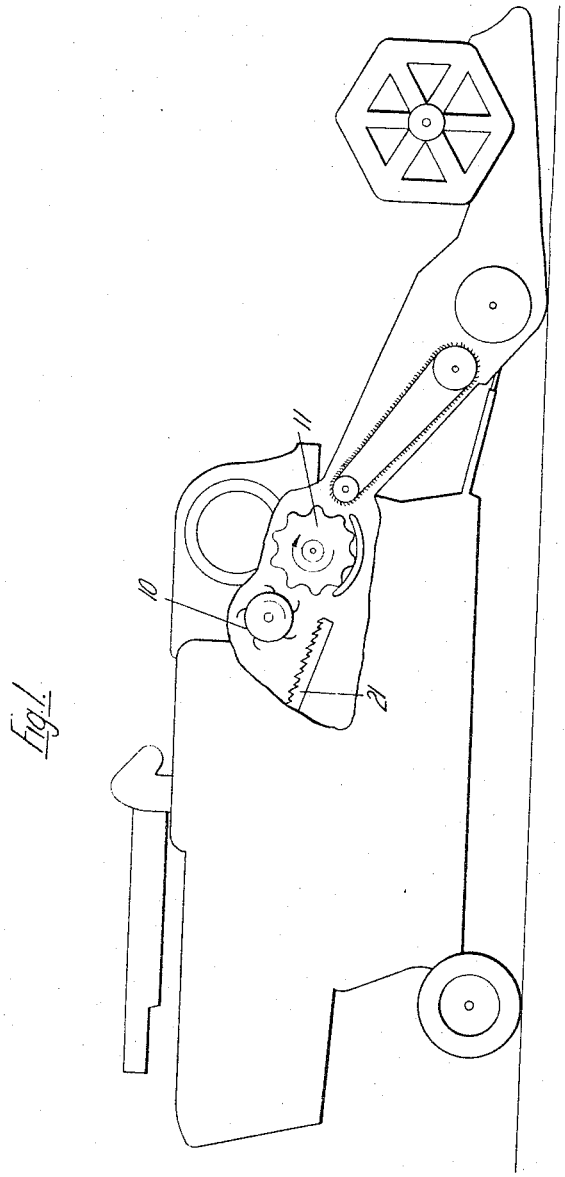
Inventors
LESLIE LYONS KEPKAY &
EDWARD GEOFFREY METCALFE
BY
Tweedale & Gerhardt
Attorneys Oct. 17, 1967   L. L. KEPKAY ETAL   3,347,244
ROTARY BEATER FOR COMBINE HARVESTERS
Filed Feb. 26, 1965   4 Sheets-Sheet 2
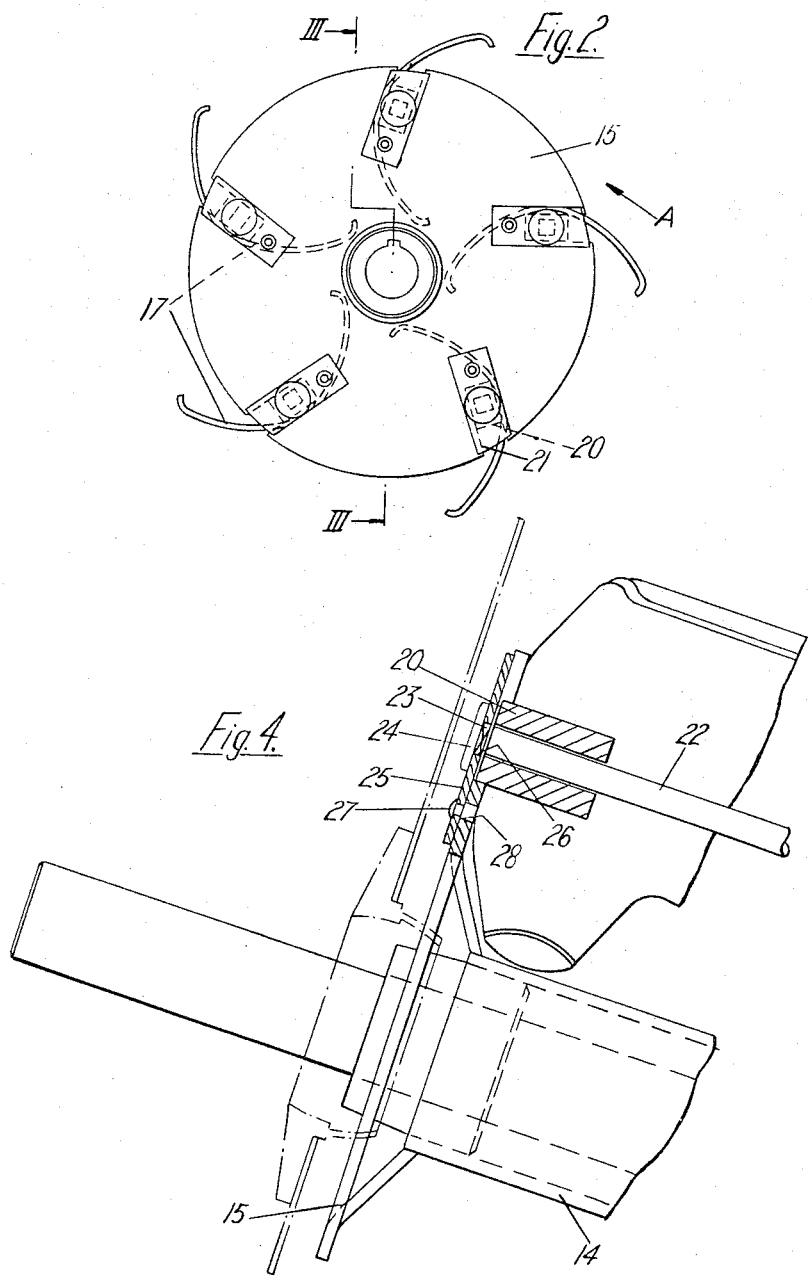
Inventors
LESLIE LYONS KEPKAY &
EDWARD GEOFFREY METCALFE
BY
Tweedale & Gerhardt
Attorneys

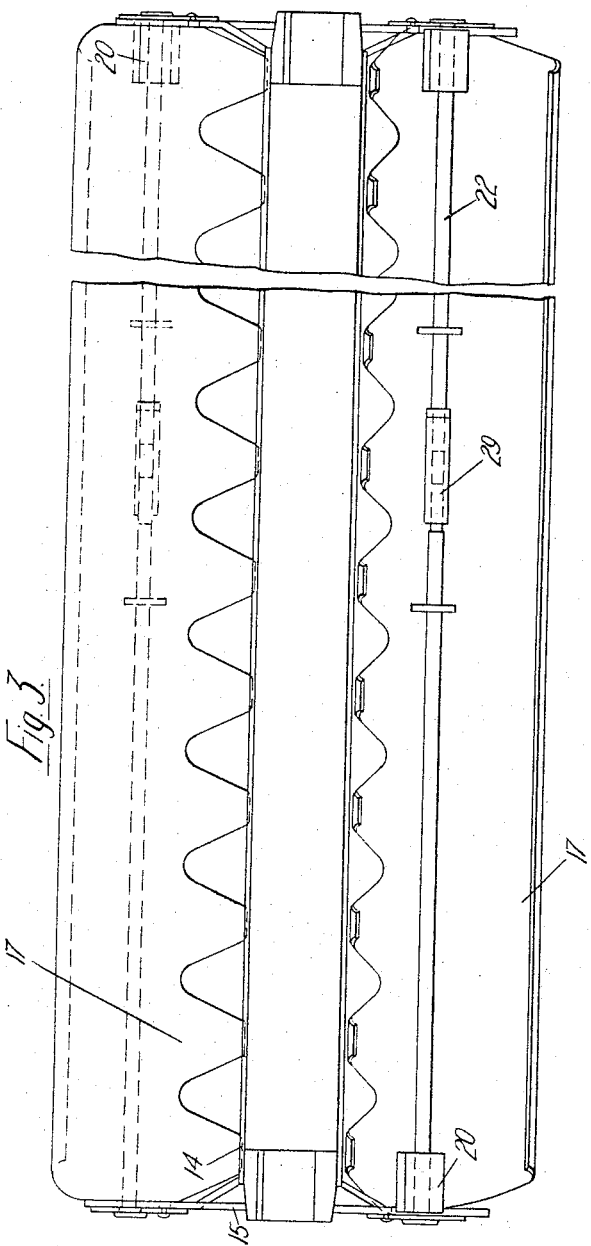

Oct. 17, 1967  L. L. KEPKAY ETAL  3,347,244
ROTARY BEATER FOR COMBINE HARVESTERS
Filed Feb. 26, 1965  4 Sheets-Sheet 4
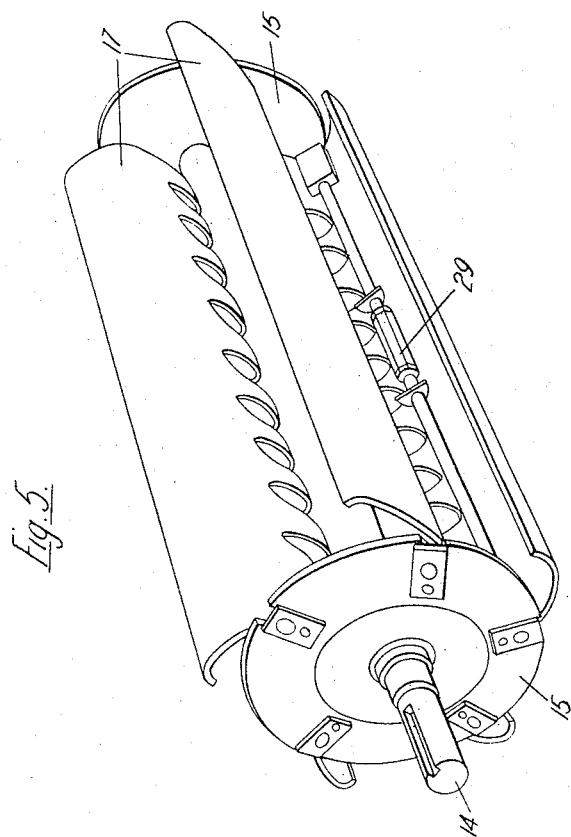
Inventors.
LESLIE LYONS KEPKAY &
EDWARD GEOFFREY METCALFE
BY
Tweedale & Gerhardt
Attorneys.

United States Patent Office 3,347,244
Patented Oct. 17, 1967

3,347,244
ROTARY BEATER FOR COMBINE HARVESTERS
Leslie Lyons Kepkay, Leamington Spa, and Edward Geoffrey Metcalfe, Cubbington, Leamington Spa, England, assignors to Massey-Ferguson Services N.V., Curacao, Netherlands Antilles
Filed Feb. 26, 1965, Ser. No. 435,420
Claims priority, application Great Britain, Mar. 3, 1964, 8,815/64
5 Claims. (Cl. 130—27)

ABSTRACT OF THE DISCLOSURE

Rotary device with a plurality of spaced blades for moving cut crop material through a threshing mechanism.

The invention is particularly, but not exclusively concerned with the construction of rotary devices known as "rear beaters" or "stripper beaters" for use in combine harvesters. Such beaters are normally located between the threshing cylinder and the straw walkers of a combine harvester and serve to remove straw from the threshing cylinder and prevent it from becoming wound around the cylinder, and to deposit the straw on the straw walkers.

A rotary device in accordance with the invention, comprises a rotor having an axially extending blade member with a plurality of axially extending, alternatively useable, material engageable edges, the blade member being selectively adjustable on the rotor so as to bring one only of the edges into a material engaging position.

Preferably, the blade member consists of a double edged blade, the opposite edges of which constitute said material engageable edges. One of said edges may be smooth and the other toothed.

A plurality of the blade members may be provided circumferentially spaced on the rotor.

Adjustment of the blade members may be effected by detaching the blade member and reattaching it reversed end to end.

An embodiment of the invention will now be described, by way of example only, with reference to the accompanying drawings in which:

FIG. 1 is a diagrammatic part sectional view of a combine having a rotary device according to the invention;

FIG. 2 is an enlarged end view of the rotary device shown in FIG. 1;

FIG. 3 is a section on the line 3—3 of FIG. 2;

FIG. 4 is a fragmentary view in the direction of arrow A in FIG. 2; and

FIG. 5 is a perspective view of the rotary device.

Referring to the drawings, in FIG. 1 the rotary device is shown in the form of a beater 10 rotatably mounted in the body of a combine between a threshing cylinder 11 and straw walker assembly 12. Most of the straw and grain from the threshing cylinder passes directly to the straw walker assembly beneath the beater, but some is entrained by the threshing cylinder and would tend to become wound round the cylinder. The beater acts in close proximity to the threshing cylinder and has a series of material engageable edges which projects outwards from the beater and strip such entrained material from the threshing cylinder and guide it beneath the beater on to the straw walker assembly 12.

With reference to FIGS. 2 and 3, the beater includes a rotatable shaft 14 and a pair of end discs 15 constituting a rotor. A plurality of axially extending members each having two axially extending crop engageable edges are selectively, adjustably mounted on the end discs 15. Each member consists of a blade 17 of substantially arcuate cross section. The axially extending edges of the blade constitute crop engageable edges and are smooth and toothed respectively (see FIGS. 3 and 4) in the illustrated embodiment.

To mount each blade 17 for rotation about the axis of shaft 14, blocks 20 are secured to the ends of the blade and are adapted to engage in substantially radial slots 21 formed in the discs 15. In the illustrated embodiment, five such slots are arranged circumferentially on each disc. Each end of the blade 17 is mounted on the associated disc 15 in the same manner, and details of one end only will be described with reference to FIG. 4.

A rod 22 is mounted in the block 21 and extends axially of the beater. The outer end of the rod is provided with an end portion 23 of rectangular cross section and a circular head 24. Releasable clamp means in the form of a locking plate 25 is disposed adjacent the outer face of the disc 15 and has a rectangular aperture 26 for accommodation of the end portion 23 of the rod 22. The plate 25 is clamped against the disc 15 by the head 24 and is provided with a stud 27 adapted to engage in an aperture 28 in the disc 15. This prevents movement of the plate 25, and hence the rod 22, block 20 and blade 17, relative to the disc.

The inner end of rod 22 is connected by a turnbuckle 29 (FIG. 3) to the inner end of the corresponding rod 22 associated with the other end of the blade 17. By tightening the turnbuckle the two rods 22 are drawn together and clamp the locking plates 25 firmly against the discs 15 at either end of the shaft 14, the studs 27 engaging in the associated apertures 28 as described above.

In the position shown in the drawings, the smooth edge of each blade 17 projects beyond the circumference of the discs 15 and, in operation, engages crop material entrained by the threshing cylinder 11, strips it from the cylinder, and guides it beneath the beater to the straw walker assembly 12. If it is desired instead to use the toothed edge, the turnbuckle 29 is loosened to permit the shafts 22 to move apart. The shafts slide axially through the blocks 20 and, when sufficient movement has occurred, the studs 27 may be removed from the apertures 28 so that the assembly consisting of the blade 17, shafts 22, blocks 20 and plates 25 may be moved radially out of the slots 19. The assembly may then be reversed end to end and reinserted in the slots 19 after which the turnbuckle is retightened. The toothed edge now projects beyond the circumference of the discs 15 and the smooth edge occupies an inoperative position adjacent the shaft 14.

By repeating this procedure for each blade in turn, all the smooth edges may be replaced by toothed edges without the necessity of having to replace the entire beater.

Although for the purpose of explaining the invention, a specific embodiment thereof has been described in detail, it is to be understood that variations and modifications within the scope and spirit of the invention may readily occur to those skilled in the art. For example, though in the embodiment described, the blades are provided with smooth and toothed edges, they may instead be provided with different types of toothed edges or one or both edges may carry spaced fingers or tines. If desired, two similar smooth edges could be provided, the inoperative edge being used when the operative one had become worn or broken.

In a further modification three or more edges may be provided any one of such edges being selectively engageable with the material while the others occupy inoperative positions. Moreover, though in the example the rotary device has been illustrated in the form of a beater, it may be used in other applications in the agricultural field or in other fields. Thus the rotary device described may be used, otherwise than in the combine, to move different types of material. Fine granular material may be moved using the smooth edge and the toothed edge can be utilized when moving for example, fibrous material.

We claim:

1. In a combine harvester including a threshing cylinder, means for feeding harvested crop material to the threshing cylinder, straw walkers for receiving crop material from the threshing cylinder, and a rotary beater between the threshing cylinder and straw walkers for stripping crop material from the threshing cylinder comprising a shaft, a pair of axially spaced discs mounted on the shaft for rotation therewith, a plurality of circumferentially spaced blades mounted between said discs in radially spaced, parallel relationship with said shaft, each of said blades having a plurality of material engaging edges of different characteristics, and means connecting said blades with said discs for selectively positioning each of said blades on said discs with a selected one of said material engaging edges projecting radically from said shaft beyond the periphery of said discs with the remaining edges disposed between said shaft and said selected material engaging edge such that the selected material engaging edge engages the material on the threshing cylinder.

2. The construction defined in claim 1 wherein said means connecting each of said blades with said discs includes a plurality of circumferentially spaced, radial slots in said discs, a block secured to each end of said blades and received in said slots, and releasable locking means for preventing disengagement of said blocks from said radial slots.

3. The construction defined in claim 2 wherein said releasable locking means includes a pair of rods for each of said blades, each rod of said pair being slidably mounted in one of said blocks in coaxial relationship with the other of said pair of rods, a locking plate non-rotatably mounted on the outer ends of said rods, means connecting the opposed inner ends of said rods for selectively moving said rods axially toward and away from each other to respectively move said locking plates toward and away from said discs, and means for coupling said locking plates to said discs as the locking plates are brought into engagement therewith.

4. The construction defined in claim 3 wherein said means connecting the opposed inner ends of said rods comprises a turnbuckle, and wherein said means for coupling said locking plates to said discs comprises an axially projecting pin on one of said locking plates and discs and a hole for receiving said pin on the other of said locking plates and discs.

5. In a combine harvester having a main body with a threshing cylinder mounted in the forward portion thereof, a rotary beater mounted in said main body adjacent said threshing cylinder for rotation about an axis transverse to the longitudinal axis of the main body and parallel to the axis of the threshing cylinder, a blade carried by said beater in spaced, parallel relationship with the rotary axis of said beater and having a plurality of material engaging edges, said blade being selectively adjustable to move a selected one of said material engaging edges to an operative position in which it projects radially from the beater to engage crop material entrained by said threshing cylinder from the threshing cylinder and simultaneously move the remaining blades to inoperative positions spaced radially inward from said one blade.

References Cited

UNITED STATES PATENTS

| 1,533,721 | 4/1925 | Becton | 56—227 X |
| 2,314,901 | 3/1943 | Scranton | 130—27.5 |

FOREIGN PATENTS

| 950,868 | 12/1960 | Great Britain. |
| 559,299 | 3/1957 | Italy. |

ABRAHAM G. STONE, *Primary Examiner.*

ANTONIO F. GUIDA, *Examiner.*